United States Patent Office 3,463,425
Patented Aug. 26, 1969

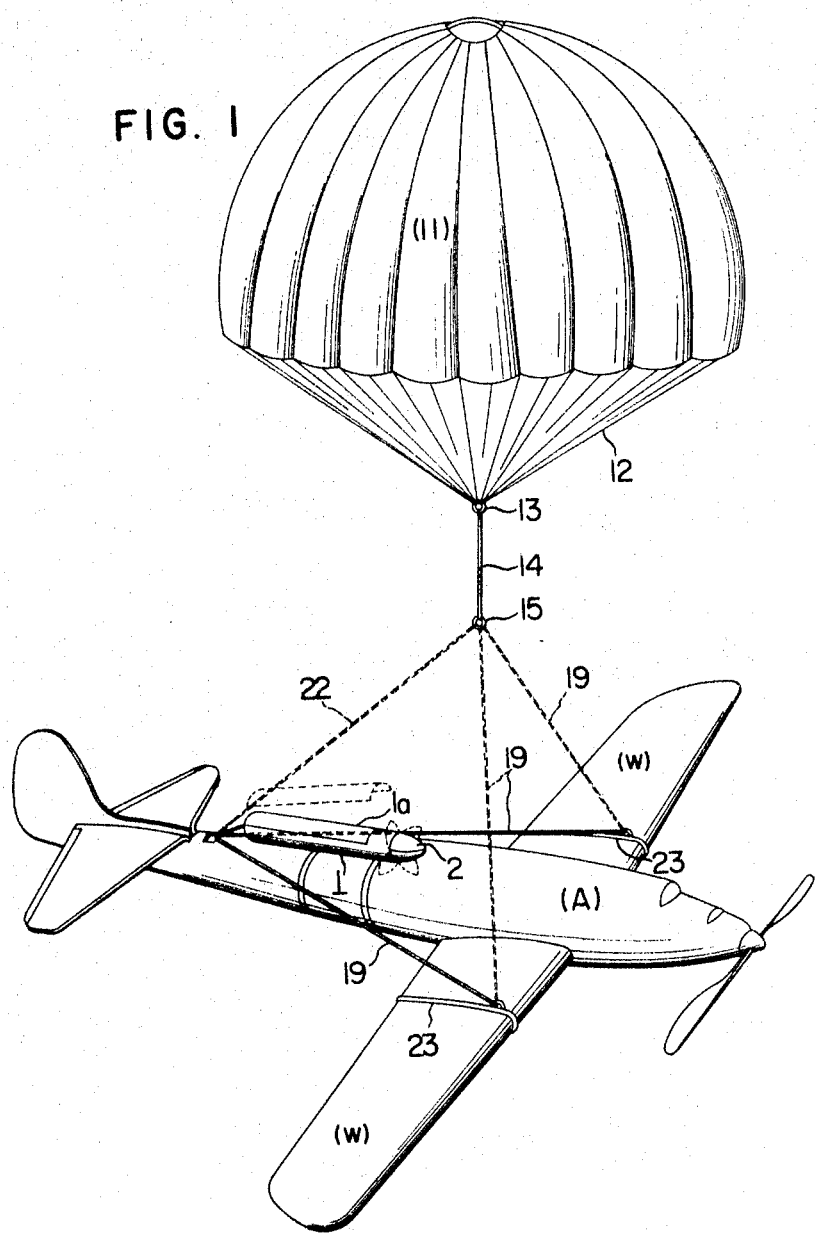

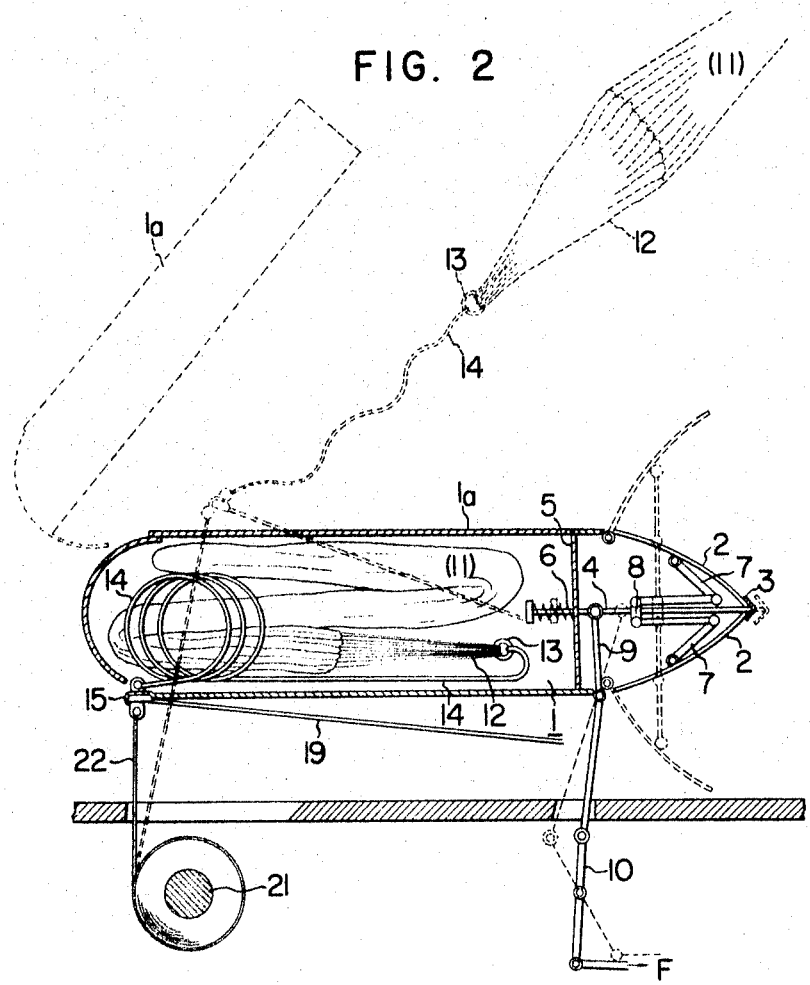
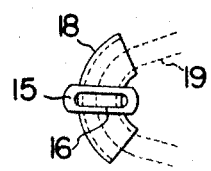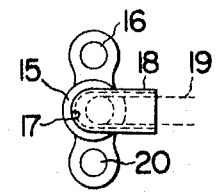

3,463,425
APPARATUS FOR STABLY LOWERING AIRCRAFT
Tatsusaburo Hibi, 2735, 2-chome, Nishisugamo, Toshima-ku, Tokyo-to, Japan
Filed Feb. 23, 1968, Ser. No. 708,481
Claims priority, application Japan, Oct. 6, 1967, 42/64,467
Int. Cl. B64d *17/80*
U.S. Cl. 244—139
3 Claims

ABSTRACT OF THE DISCLOSURE

A parachute mounted on an aircraft airframe can be operated in an emergency during flight from a point within the aircraft or from a remote point by radio to eject a parachute and its suspension gear from a storage housing, whereupon the parachute opens to suspend the aircraft through shroud lines, a load or suspending line, and a three-line bridle sling connected to the wings and tail portion of the aircraft and thereby to cause the aircraft to descend stably to earth.

BACKGROUND OF THE INVENTION

This invention relates generally to the field of aeronautics and to the particular field of so-called aviation. More particularly, the invention relates to the art of bringing airborne aircraft safely to earth in an emergency.

The present invention is intended for application not only to aircraft for carrying human beings but also to model aircraft and so-called "drone" aircraft controlled remotely by radio signals.

Substantial developments have been made in recent years in techniques for radio control of crew-less aircraft. A problem which still occurs frequently, however, is that, when a radio signal of the same or approximately the same wavelength as the signals being used in the radio control system is transmitted, radio interference occurs whereby control is lost, and this loss of control inevitably leads to damage or total destruction of the aircraft.

The resulting economic loss is great since such aircraft are generally expensive. A failure of an ordinary aircraft carrying human personnel resulting in a crash or forced gliding landing on adverse terrain is even more serious.

SUMMARY OF THE INVENTION

It is an object of the present invention to provide a parachute apparatus for mounting on an aircraft which apparatus operates in an emergency during flight, such as stalling or failure of the aircraft propulsion means or of some other component thereof, to suspend the entire aircraft in a stable manner, to reduce the velocity of descent, and thereby to cause the aircraft to alight gently and stably on the ground or water surface.

According to the present invention, briefly summarised, there is provided a parachute apparatus of the above stated character which includes a parachute and suspension gear including a single load or suspending line connected between the shroud lines of the parachute and a three-line bridle sling connected to the wings and tail portion of the aircraft, the parachute and suspension gear being normally housed within an openable storage housing mounted on the aircraft and being ejected upon remote control of the apparatus either from a control point within the aircraft or from a remote point on the ground or another aircraft by radio control.

BRIEF DESCRIPTION OF THE DRAWINGS

The nature, details, and utility of the invention will be more clearly apparent from the following detailed description with respect to a preferred embodiment of the invention when read in conjunction with the accompanying drawings, in which like parts are designated by like reference numerals.

In the drawings:

FIG. 1 is a general perspective view showing an aircraft provided with an example of the parachute apparatus of the invention in the state when the parachute of the system has been opened during flight;

FIG. 2 is an elevational view, in vertical section, showing a storage cylinder for the parachute;

FIG. 3 is a planar view showing an example of a sling shackle for connecting a suspending line of the parachute to a three-line bridle sling; and FIG. 4 is a side view of the shackle shown in FIG. 3.

DETAILED DESCRIPTION OF THE INVENTION

Referring to FIGS. 1 and 2, the example of the apparatus according to the invention shown therein is provided with a parachute 11 which, together with its suspension gear, is normally stored in a parachute storage cylinder 1 mounted on the fuselage A of an aircraft at a position between the wings ($w$, $w$) the tail and aligned with its fore-and-aft axis substantially parallel to the direction of normal flight.

The parachute storage cylinder 1 has a streamlined nose composed of several sepal-like divisions or sections 2 hinged at their rear proximal edges around the front edge of the cylindrical structure of the cylinder 1 to form a cluster, which in the normally closed state forms the nose with an approximately conical front tip. In the normal state, the forward distal ends of the sections 2 forming the front nose tip are held together and fixed by a conical cap 3, which is fixed to the front end of a shift rod 4 constituting a member of a nose closing and opening mechanism of the following description.

The shift rod 4 is centrally and axially disposed within the front nose and forward part of the cylinder 1 and corresponds to the centre pole or stem of an umbrella. The rear part of the rod 4 is passed through a transverse member 5 positioned diametrically across the cylinder 1 and is continually urged rearward by the force of a compression spring 6. The shift rod 4 is fixed at a point thereof intermediate between its ends to a flange 8, around and to which the inner ends of articulated linkages 7 of the same number as the sections 2 are pivotally connected. The articulated linkages 7 at their outer ends are pivotally connected to the inner sides of respective sections 2 and correspond to the actuating linkages connected to the ribs of an umbrella.

The rearward force exerted by the spring 6 on the shift rod 4 tends to close the sections 2 and pulls the cap 3 firmly in its holding and fixing state whereby the sections 2 are normally closed. When a forward force overcoming the force of the spring 6 is applied to the shift rod 4, the cap 3 releases the distal tips of the sections 2, which are thereupon opened widely to the positions indicated by intermittent lines in FIG. 2 by the airstream flowing thereby when the aircraft is airborne. Consequently, the dynamic pressure of the airstream is applied directly to the interior of the storage cylinder 1.

The upper half of the storage cylinder 1 other than parts thereof supporting the proximal ends of the sections 2 is in the form of an upper shell 1a which is detachable along a horizontal plane approximately through the centerline from the remainder of the storage cylinder structure 1. Normally, when the system is in inoperative state, the shell 1a is lightly held in place to preserve the normal cylindrical shape of the storage cylinder 1 with sufficient locking action by suitable known means (not shown) to resist dislodgement by the external forces due to ordinary flight. When the airstream pressure is introduced abruptly by the opening of the sections 2 as described above, the upper shell 1a is thereby blown off to open the upper half of the storage cylinder 1.

The upper end of a lever 9 for actuating the aforementioned shift rod 4 forward, counter to the force of the spring 6, is pivotally connected at its upper end to the rod 4 and is coupled at its lower end through a suitable linkage 10 to control means (not shown) within the aircraft fuselage, whereby the sections 2 can be remotely opened from a point within the fuselage.

The interior of the parachute storage cylinder 1 to the rear of the nose is designed to house, in folded or packed state, the aforementioned parachute 11 and its suspension gear comprising shroud lines 12 connected to the canopy, a collector fitting or shackle 13 connected to the lower ends of the shroud lines, a single riser or suspending line 14 made of steel wire rope connected to the fitting 13, and a three-way sling shackle 15 as shown in FIGS. 3 and 4, having an upper eye-ring 16 to which the lower end of the suspending line 14 is connected.

The sling shackle 15 further has a lower eye-ring 20 between which and the upper eye-ring, there is fitted an arcuate thimble tube 18. A continuous length of a sling line is passed through the thimble tube 18 to form starboard and port sling lines 19, 19, which are connected at their ends to bandages 23, 23 fixed to the starboard and port wings w, w, respectively, of the aircraft. The line forming the sling lines 19, 19 is disposed with slight freedom in sliding through the thimble tube 18 so as to maintain equilibrium of forces in the sling lines 19, 19.

The free end of a tail sling line 22 wound around a reel 21 rotatably supported within the fuselage at a part thereof near its tail is connected to the lower eye-ring 20 of the sling shackle 15, the reel end of the sling line 22 being secured to the reel 21.

Thus, in the normal state, the spring 6 is permitted to push the shift rod 4 rearward to cause the articulated linkages 7 to fold and the sections 2 to close and be held thus by the nose cap 3, and the parachute 11 and the suspension gear including the shroud lines 12 and suspending line 14 are stowed within the parachute storage cylinder 1. At the same time, the tail sling line 22 is wound up on the reel 21 within the fuselage, whereby the side sling lines 19, 19 are drawn together with the tail sling part 22 along the fuselage A.

Then, in an emergency during flight, such as loss of radio control, stalling or engine failure of the aircraft, the shift rod 4 is moved forward automatically or by remote control from a control point within the fuselage thereby to open the sections 2 and cause the various parts to assume their respective positions as indicated by intermittent lines in FIG. 2, the upper shell 1a being blown off by the entering airstream. Consequently, the canopy of the parachute 11 is also blasted away and opens, whereupon the side sling parts 19, 19 are pulled taut in the upward directions and a predetermined length of the tail sling line 22 is also reeled out.

As a result, all sling lines are stretched and, in combination, form a tetrahedron with three equal sides intersecting at the vertex, where the sling shackle 15 is connected to the lower end of the suspending line 14 connected at its upper end to the parachute shroud lines 12 through the collector fitting 13. Thus, the aircraft airframe is suspended in a horizontal attitude.

Since the parachute 11 is then maintained in a fully open state, and the airframe is thus suspended through an intermediate riser or suspending line 14, the parachute is unaffected by unstable rocking or oscillatory motions of the aircraft. Accordingly, irrespective of the motions of the aircraft, the velocity of descent of the aircraft thus suspended remains unchanged until the aircraft alights on the ground. In this manner, the lowering of the aircraft in an emergency is accomplished in a stable and safe manner.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. Parachute apparatus for stably lowering an aircraft having a fuselage (A) and control means therein, said parachute apparatus comprising in combination:

(a) a parachute storage cylinder (1) having a generally cylindrical body mounted longitudinally on said fuselage (A) and including a separable upper body shell portion (1a) normally attached to said body to resist dislodgement by external flight forces incurred in ordinary flight, but adapted to be separated therefrom by extra-ordinary flight forces such as those entering internally of said cylinder body;

(b) said storage cylinder (1) further including separable nose cone sections (2) hinged at their rearward ends to said cylindrical body to form a streamline front nose having a conical front tip;

(c) a parachute (11) enclosed within said cylinder and having suspending line means (12–23) which connect with and adapted to support the aircraft in emergency situations when said parachute (11) is deployed;

(d) a conical retaining cap (3) to removably hold the forward ends of said front nose tip in closed condition;

(e) an axially shiftable nose-cap-retaining rod (4) disposed generally centrally and axially within said front nose and forward part of said cylinder (1), said rod (4) being attached to said conical retaining cap (3) at its forward end;

(f) means fixed within said storage cylinder (1) to support said rod (4) near its opposite and rearward end, and said rearward end having spring-bearing means thereon;

(g) a spring (6) interposed between said latter two means of paragraph (f) for normally biasing said rod (4) in a rearward direction to hold said conical tip closed by means of said conical cap (3);

(h) a link lever (9) connected at one end with an intermediate portion of said rod (4) and at its other end with said control means within said fuselage (A) by means including a linkage (10), (i) said link lever (9) being fulcrumed intermediate its ends and operable to urge said shiftable rod (4) axially forward against the force of said spring (6) when said rod (4) is actuated by said control means within said fuselage, thereby releasing said conical cap (3) from holding the nose cone sections (2) to subject said sections (2) to the air stream forces of flight to open said sections, said air stream forces thereby entering said cylinder body and blowing off the upper shell portion (1a) to eject said parachute from the cylinder.

2. Parachute apparatus as defined in claim 1 wherein the aircraft includes wings with wing root sections near the fuselage, and the line suspending means of paragraph (c) includes three-line bridle sling means of which two of the three lines comprise opposite ends of an integral elongated length of line and attachable near the wing roots on opposite sides of the fuselage; a bridle sling shackle (15) operatively connected to the parachute and having an arcuate thimble tube (18), said elongated line being freely slidable through said thimble to provide substanital equilibrium of forces in the said two lines (19, 19).

3. Parachute apparatus as defined in claim 2 wherein the line suspending means also includes a rotatable reel mounted within a rearward portion of said fuselage, and the third line is an elongated extensible line attachable at one end to said shackle (15) and at the other end to the rotatable reel on which it is normally wound when the parachute is in its undeployed condition within said storage cylinder.

References Cited

UNITED STATES PATENTS

| | | | |
|---|---|---|---|
| 1,747,215 | 2/1930 | Bergh | 244—139 |
| 2,072,600 | 3/1937 | Lewis et al. | 244—139 |
| 3,113,752 | 12/1963 | Brestel | 244—147 |

MILTON BUCHLER, Primary Examiner

THOMAS W. BUCKMAN, Assistant Examiner

U.S. Cl. X.R.

244—147